United States Patent
Powell et al.

(10) Patent No.: US 9,202,087 B2
(45) Date of Patent: Dec. 1, 2015

(54) METHOD AND APPARATUS FOR CONTROLLING ACCESS TO LOCAL STORAGE DEVICES

(75) Inventors: Carl Marshall Eliot Powell, Gaithersburg, MD (US); John-Francis Mergen, Baltimore, MD (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1856 days.

(21) Appl. No.: 11/554,832

(22) Filed: Oct. 31, 2006

(65) Prior Publication Data

US 2008/0104694 A1    May 1, 2008

(51) Int. Cl.
*G06F 12/00*    (2006.01)
*G06F 21/78*    (2013.01)

(52) U.S. Cl.
CPC .................................. *G06F 21/78* (2013.01)

(58) Field of Classification Search
CPC ............. G06F 12/0246; G06F 2212/7202; G06F 3/0688; G06F 12/00; G06F 12/0868; G06F 21/604; G06F 21/62; G06F 2212/401; G06F 2212/7203; G06F 2212/7208; G06F 3/0607; G06F 3/0608; G06F 3/0631
USPC ........ 726/1, 2, 16, 5, 12, 21, 24, 25; 713/153; 711/115
See application file for complete search history.

(56) References Cited

U.S. PATENT DOCUMENTS

| | | | | |
|---|---|---|---|---|
| 5,321,832 A * | 6/1994 | Tanaka et al. | | 1/1 |
| 6,314,501 B1 * | 11/2001 | Gulick et al. | | 711/153 |
| 6,907,504 B2 * | 6/2005 | Burton et al. | | 711/162 |
| 6,990,561 B2 * | 1/2006 | Yae et al. | | 711/154 |
| 7,047,382 B2 * | 5/2006 | Geiger et al. | | 711/165 |
| 7,103,746 B1 * | 9/2006 | Kulick | | 711/173 |
| 7,562,293 B2 * | 7/2009 | Marcy et al. | | 715/237 |
| 2002/0073298 A1 * | 6/2002 | Geiger et al. | | 711/206 |
| 2003/0046589 A1 * | 3/2003 | Gregg | | 713/201 |
| 2003/0167376 A1 * | 9/2003 | Koh | | 711/115 |
| 2003/0221124 A1 * | 11/2003 | Curran et al. | | 713/201 |
| 2004/0015694 A1 * | 1/2004 | DeTreville | | 713/172 |
| 2004/0088567 A1 * | 5/2004 | Lamotte | | 713/200 |
| 2004/0243797 A1 * | 12/2004 | Yang et al. | | 713/2 |
| 2005/0066191 A1 * | 3/2005 | Thibadeau | | 713/200 |
| 2005/0086433 A1 * | 4/2005 | Okaue et al. | | 711/115 |
| 2005/0210236 A1 * | 9/2005 | Lee et al. | | 713/153 |
| 2006/0005254 A1 * | 1/2006 | Ross | | 726/27 |
| 2006/0156405 A1 * | 7/2006 | Forman et al. | | 726/24 |
| 2007/0043888 A1 * | 2/2007 | Suzuki et al. | | 710/62 |
| 2008/0147924 A1 * | 6/2008 | Lambert et al. | | 710/62 |
| 2008/0209548 A1 * | 8/2008 | Haselsteiner et al. | | 726/21 |

* cited by examiner

*Primary Examiner* — Joseph P Hirl
*Assistant Examiner* — Sayed Beheshti Shirazi

(57) ABSTRACT

An approach is provided for controlling access to local storage medium. A request is detected from an operating system for accessing a local storage medium. An intermediary agent selectively grants access to the local storage medium according to an access policy, wherein the intermediary agent is distinct from the operating system.

22 Claims, 5 Drawing Sheets

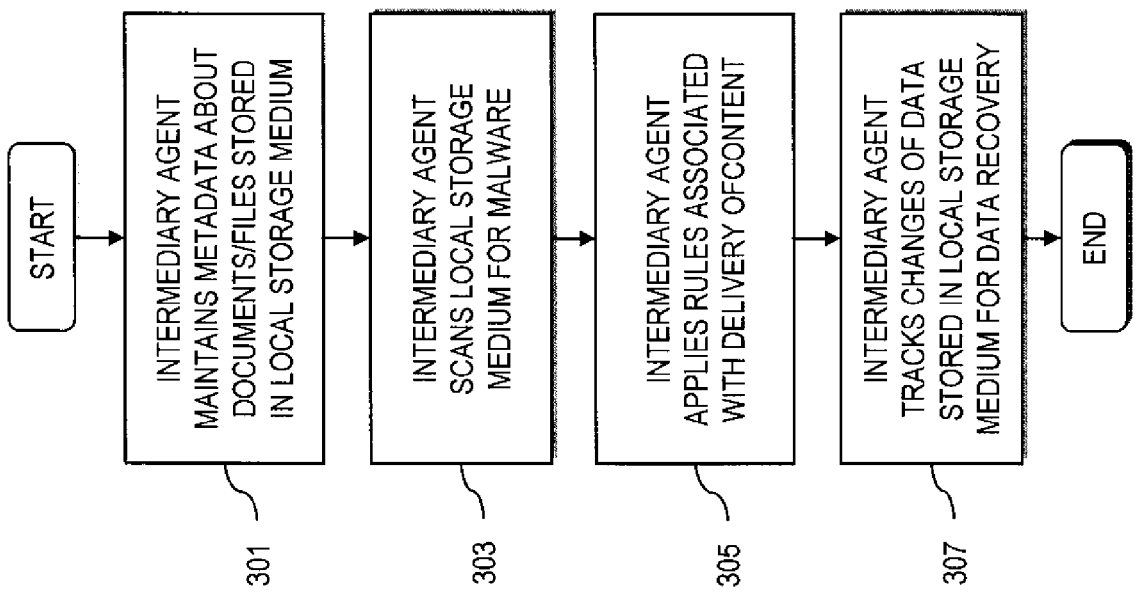

METHOD AND APPARATUS FOR CONTROLLING ACCESS TO LOCAL STORAGE DEVICES

BACKGROUND INFORMATION

In general, operating systems (O/S) for computing devices, such as personal computers, have direct access to local storage devices (e.g., disk drive, flash memory), and can change data stored on within the storage device—including the stored copy of the operating system used at boot up. This direct access results in a number of concerns. First, since the code that the personal computer runs is accessible, malware (such as viruses, Trojan Horses or spyware) can modify the code to infect the system in a manner that can be persistent between boot cycles. Certain sophisticated malware can even insert itself into the scanning utilities used to detect the malware, thereby rendering protective programs ineffective against the virus. Second, changes to the disk occur nearly instantaneously, thus files that are deleted or damaged are often unrecoverable. Thirdly, since there is no mechanism to track changes to the file system, it is difficult and often unreliable to determine whether a document has been viewed or modified by a particular user. Lastly, because the O/S can enforce access rules, data stored on the storage device is at risk from attacks on the O/S or from unauthorized user modifications.

One traditional approach to address the above concerns involves the use of network file servers. However, a file server implementation introduces other issues, such as performance and scalability. Also, the requirement to maintain connectivity to the network limits the applicability of a network file server approach to an unnecessarily narrow range of applications. Further, the added complexity of using an additional network component, e.g., the file server, can negatively impact the reliability of the system.

Therefore, there is a need for an approach to effectively control access to local storage medium, while providing improved performance and scalability.

BRIEF DESCRIPTION OF THE DRAWINGS

The invention is illustrated by way of example, and not by way of limitation, in the figures of the accompanying drawings in which like reference numerals refer to similar elements and in which;

FIG. 3 is a flowchart of exemplary functions of the intermediary agent of FIG. 2, according to an embodiment of the present invention;

FIG. 4 is a flowchart of a process for enforcing an access policy by the intermediary agent of FIG. 2, according to an embodiment of the present invention;

DETAILED DESCRIPTION

An apparatus, method, and software for providing access control to local storage medium are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
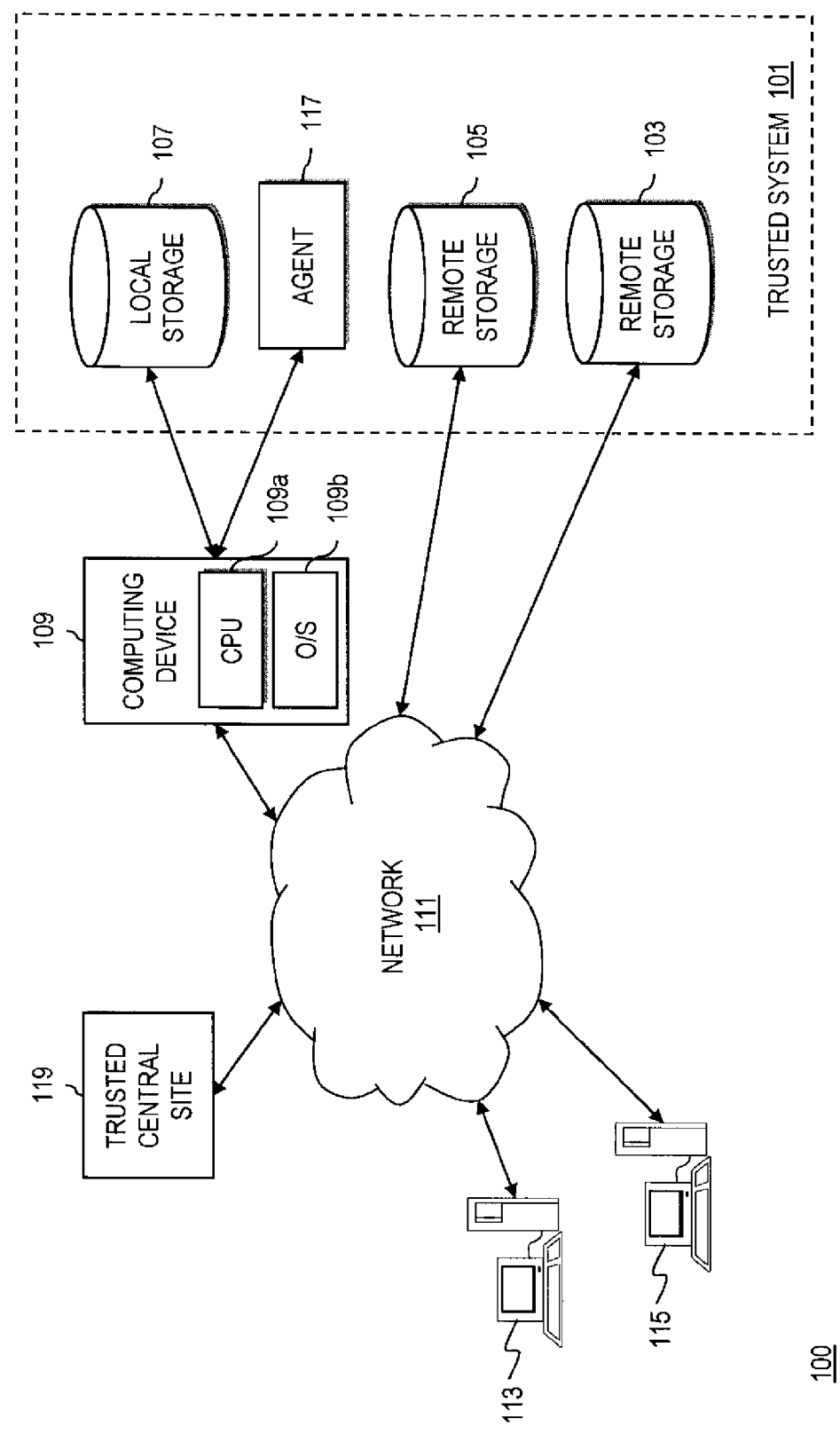
FIG. 1 is a diagram of a system having a control infrastructure in communication with an intermediary agent to control access of a local storage medium, according to an embodiment of the present invention.

FIG. 1 is a diagram of a system having a control infrastructure in communication with an intermediary agent to control access of a local storage medium, according to an embodiment of the present invention. For the purposes of illustration, the local storage access control mechanism can be used in a communication system 100 that implements a trusted system 101. The trusted system 101 can include remote storage devices 103, 105 as well as a local storage medium (or device) 107 (e.g., flash memory, disk drive, or any non-volatile storage medium). The device 107 is local to a computing device 109, such as a personal computer, workstation, laptop computer, personal digital assistant (PDA), etc. The device 109 includes a central processing unit (CPU) 109*a* for interpreting and executing instructions of, for example, an operating system (O/S) 109*b*. The O/S 109*b*, among other functions, controls the allocation of resources within the device 109 as well as software applications. The types of operating systems vary depending on the hardware and the applications that are supported, and include the following: (1) real-time O/S; (2) single user-single task; (3) single user-multitasking; and (4) multi-user. Exemplary operating systems for personal computers and workstations include MICROSOFT WINDOWS family of O/Ss, UNIX, LINUX, LINDOWS, APPLE O/S, etc. For PDAs, exemplary O/Ss include PALM O/S and MICROSOFT WINDOWS CE ("POCKET PC").

The computing device 109, in this example, connects to a data network 111. Additionally, the network 111 can support multiple hosts 113, 115, which may possess local storage devices (not shown). These devices can be included within the trusted system 101 if trusted agents are deployed within the hosts 113, 115.

As shown, the system 100 uses a trusted agent 117 that communicates with a control infrastructure as an intermediary for access to the local storage device 107. The control infrastructure can be implemented as a centralized service i.e., trusted central site 119. This trusted central site 119 is well-suited for a large organization having disparate network components and systems. Additionally, the control infrastructure can be a local out-of-band connection that the user can operate. Further, the control infrastructure can be implemented as a virtual machine that a user can control. Moreover, it is contemplated that the agent 117 can also be virtualized. According to one embodiment of the present invention, the term "virtual machine" refers to one or more virtualized environments within a single computing platform, wherein the environment permits execution of code developed for one O/S to be executed on a different O/S.

The agent 117 enforces policies on file system access, can maintain metadata or version information associated with documents, and can journal changes for recovery purposes. These functions are more fully described below with respect to FIG. 2.

Figure 2:
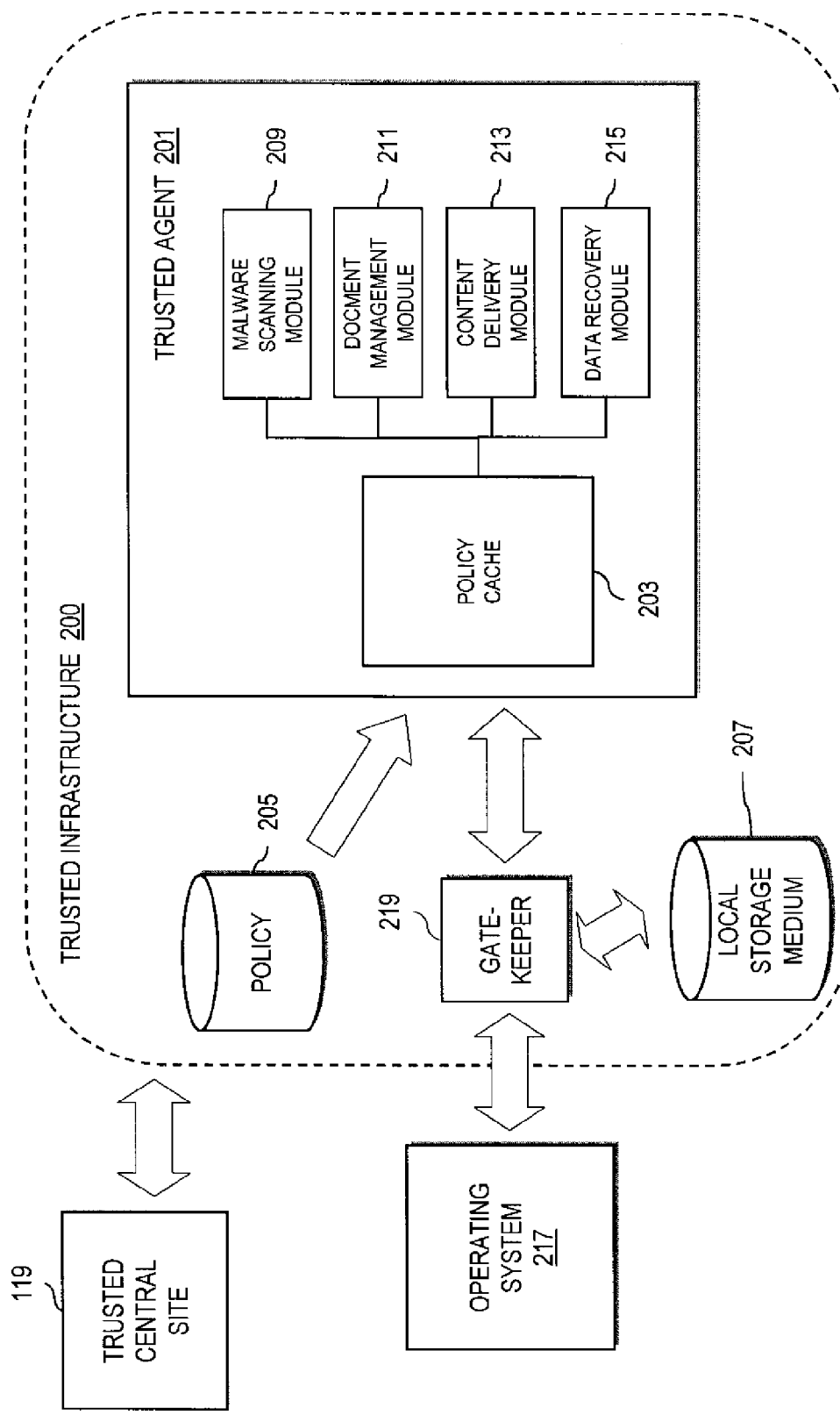
FIG. 2 is a diagram of an intermediary agent capable of applying access rules to a local storage medium, according to an embodiment of the present invention.

FIG. 2 is a diagram of an intermediary agent capable of providing secure local data storage, according to an embodiment of the present invention. In this example, a trusted infrastructure 200 comprises a trusted agent 201, which can effect access policies stored with a policy cache 203. According to one embodiment, the policies are disseminated by a policy server 205. The trusted agent 201 is configured to interface with a local storage medium 207—e.g., hard disk drive. As shown, the policy server 205 and the local storage medium 207 are a part of the trusted infrastructure 200. Reporting and control of the agent 201 can occur from the central site 119 or local trusted service (not shown) via authenticated and integrity-ensured communications. The intermediary agent 201 can support a variety of functions. For example, the agent 201 can include a malware scanning module 209, a document management module 211, a content delivery module 213 and a data recovery module 215.

An operating system (O/S) 217 does not have the ability to communicate directly with the agent 201; accordingly, malware (such as viruses, Internet worms, Trojan Horses, spyware, etc.) cannot corrupt the policies that are stored within the trusted agent 201. The trusted agent 201, as an intermediary agent, is not part of the operating system 217, but rather part of a distributed and trusted infrastructure. By operating outside of the realm where the O/S 217 can access the agent 201, the agent 201 provides a trustworthy capability to control and report on access to the information stored on the disk. Policies implemented on the agent 201 can, for example, prevent the O/S 217 from modifying any of a set of files that are determined to be critical to correct (i.e., non-malware-influenced) operation, or could prevent them from being modified unless a special access token was granted from the central site (e.g., site 119 of FIG. 1) or a local trusted entity.

The O/S 217 communicates with a gatekeeper 219, as if it were a storage medium (e.g., physical drive). The gatekeeper 219 can either permit or deny O/S read/write requests depending on the result of a policy decision made by the trusted agent 201. The O/S 217 cannot communicate directly with the trusted agent 201, and does not have the ability to send policy requests or responses to the gatekeeper 219. The O/S 217 also can be restricted from direct communicating with the local storage medium 207 (e.g., disk drive, or other controlled storage), since all access to the medium 207 device is mediated by the gatekeeper 219.

Additionally, all control communication (e.g., setting policies, transferring trusted files, sending events, etc.) into and out of the trusted agent 201 is handled in a secure manner via a tunnel or any communication path. In an exemplary embodiment, the communication can be out-of-band communication to an external device (via a separate network, a directly connected device such as a Universal Serial Bus (USB)-connected user interface, or inter-virtual-machine communications in a virtualized environment), or could be an encrypted tunnel across the network 111 to other parts of the trusted infrastructure 200. The tunnel can traverse the O/S 217 to reach the network; however, the O/S 217 would not be able to read or modify the contents of the tunneled communications because end-to-end encryption can be utilized between the trusted agent 201 and the remote portion of the trusted infrastructure 200. The inability of the operating system 217 to directly influence the trusted agent 201 or its controlling policies ensures that the trusted agent 201 remains trusted.

The trusted agent 201 addresses the drawbacks of traditional access control mechanisms by acting as an intermediary between the operating system 217 and the local storage medium (e.g., physical disk drive).

The agent 201 can provide reliable malware scanning and block malware attacks via the malware scanning module. Malware scanning performed by the agent 201 would be immune to malware attempts to corrupt the agent 201, since the malware would not have access to the agent 201.

Also, the agent 201 can provide document traceability through the document management module 307. The trusted agent 201, in addition, has the capability to roll back changes to the local disk 207 in an O/S-independent manner.

Moreover, changes to the disk contents can be journaled by the data recovery module 215, allowing recovery in the event of malware infection or accidental deletion. Metadata in a file or kept separate from the file could be updated to reliably track version numbers and/or access to controlled documents.

The arrangement of FIG. 2 can provide enhanced performance and scalability over traditional systems, such as a file server system, because the agent 201 can be resident in a local computing device 109, in an exemplary embodiment, and can continue to function even if not connected to the network 111.

In addition, the metadata could also contain information on the appropriate use of information stored on the storage system 207. Using this type of control mechanism, the content located on the storage system 207 can be protected and controlled under a policy based set of rules via the content delivery module 213.

According to an embodiment of the present invention, an agent is associated with each local storage system (e.g., disk drive, flash memory) and a monitoring/control infrastructure. The agent 201 mediates all access between the O/S 217 and the storage system 207, presenting a virtual drive interface for the O/S 217 to use. The agent 201 has a set of policies that define what tasks it is to perform. These policies might include placing access controls on certain portions of the file system, journaling or other forms of change management, updating and/or tracking of controlled documents, limiting the number of copies which could be made, or scanning files for malware. The policies are controlled by a central infrastructure that communicates with the agent through a secure connection. The local O/S 217 has no capability of accessing the agent's policies directly and is generally treated as an untrusted third party. By not relying on the O/S 217 for the capabilities provided by the agent 201, concerns about corruption of the O/S 217 are eliminated. Malware or malicious users do not have the capability to alter the agent's ability to implement its policies. The agent 201 may also implement journaling to track changes to the disk. This can be employed both for identification of malware attacks and to roll back changes caused by inadvertent user action.

In an exemplary embodiment, the initial policies are loaded into the policy cache 203 from the policy server 205 at system configuration time by the control infrastructure (e.g., trusted central site 119 of FIG. 1). The control infrastructure also loads the information needed to communicate securely with the computing device. Alternatively, the control system can communicate via a secure connection directly to the agent 201. Strong authentication and integrity checking can be deployed to prevent the local O/S 217 (or any other entity) from masquerading as the control infrastructure. Depending on the degree of trust required by the implementing organization, the agent 201 may be implemented accordingly to various types of hardware, ranging from tamper resistant units to a motherboard, for instance.

With the content delivery module 213, the trusted agent 117 is able to enforce access rules that can control the use of "down loaded" content. In an exemplary embodiment, as users load content onto the storage device 207 and later accessed the device 207, a remote authority can enforce the rules for use of the content using the trusted agent 201. This mechanism can reduce the unauthorized use of content, thereby permitting a greater degree of confidence on the part of content creators (e.g. movie studios, musicians, etc.) that their works are properly distributed and managed.

FIG. 3 is a flowchart of exemplary functions of the intermediary agent of FIG. 2, according to an embodiment of the present invention. Continuing with the example of FIG. 2, the operation of the intermediary agent 201 is now described. In step 301, the intermediary agent 201, via the document management module 211, maintains metadata about documents and/or files stored in the local storage medium 207. Also, the agent 201 can scan the local storage medium 207, as in step 303, for malware through the malware scanning module 209. Per step 305, the agent 201 can apply rules associated with delivering content through the content delivery module 213. For example, the content delivery module 213 can specify the conditions and security measures for download of the content to a remote system. Also, in step 307, the agent 307 can, using the data recovery module 215, to track changes of data stored in the local medium for data recovery purposes.

It is contemplated that anyone of the above steps can be optionally performed, and further individually or in any combination. Moreover, the sequence of the steps can be in any order.

FIG. 4 is a flowchart of a process for enforcing an access policy by the intermediary agent of FIG. 2, according to an embodiment of the present invention. In step 401, the intermediary agent 201 retrieves an access policy stored within the policy cache 203. Under this scenario, the intermediary agent 201 detects, per step 403, a request from the operating system 217 for accessing the local storage medium 207. Assuming the request comports with the access policy, the intermediary agent 201 grants access to the operating system 217, as in step 405.

Figure 5B:
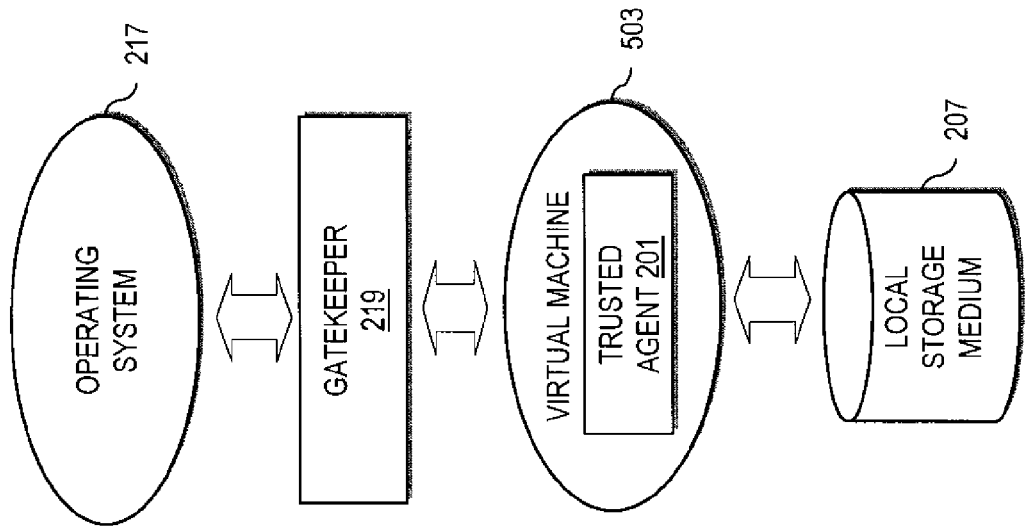
FIGS. 5A and 5B are diagrams of, respectively, a hardware implementation and a software implementation of the intermediary agent of FIG. 3, according to an embodiment of the present invention.
Figure 5A:
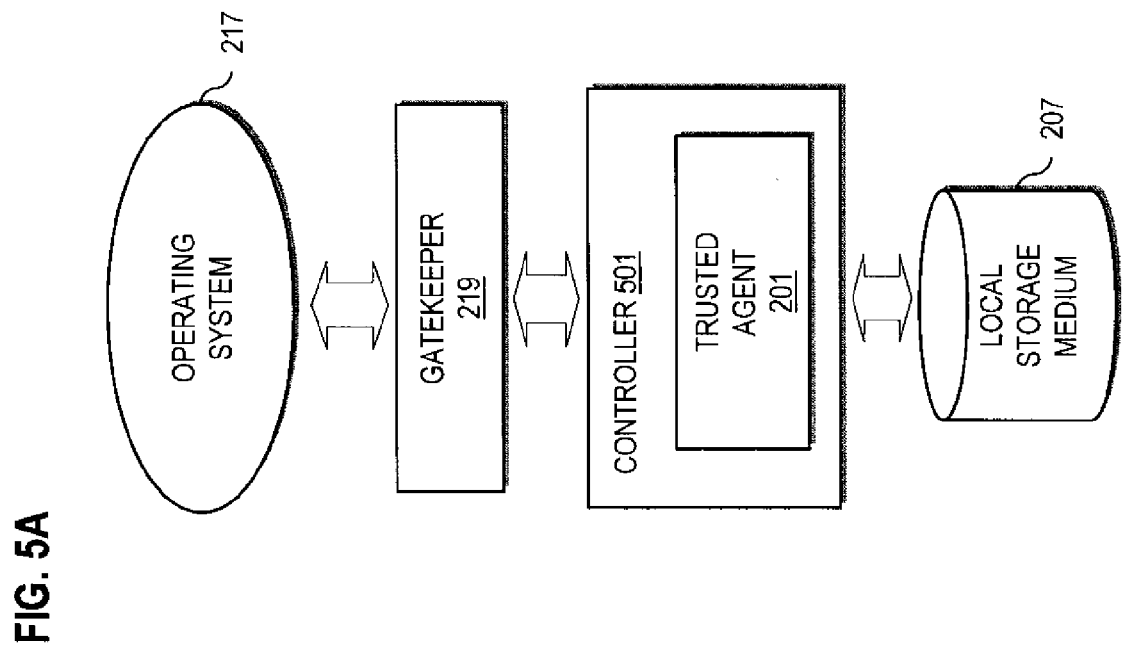

FIGS. 5A and 5B are diagrams of, respectively, a hardware implementation and a software implementation of the intermediary agent of FIG. 3, according to an embodiment of the present invention. As seen in FIG. 5A, the trusted agent 201 can be implemented in hardware as part of a controller 501 of the local storage medium 207 (e.g., hard disk drive). Depending on the degree of trust required by the implementing organization, the agent 201 may be attached to the drive in a tamper-evident manner or may simply be built into the motherboard or input/output (I/O) system of a local computing device 109 (FIG. 1), for example.

Alternatively, FIG. 5B shows a software implementation involving a virtual machine 503. The agent hardware can be virtualized as long as the agent 117 cannot be accessed or modified by the O/S 217.

The described approach for access control of local storage media, according to certain embodiments, integrates a remote control mechanism and a hardware controller to provide a seamless mechanism for control of software access. This control infrastructure approach contrasts with the traditional approaches, which include the use of file servers, administrative audits, remote audit clients and software patch management systems. The integration and the uses of a cryptographically protected client control removes one of the major problems with traditional software based configuration and access control systems—which is the vulnerability of software to attack or misconfiguration. The use of a remote client to address hardware for the moderation of information access is a departure from the traditional approach of using a software agent to accomplish this task. Also, the use of a system to control data access based on policy rather than for configuration control distinguishes the system 200 of FIG. 2 from the traditional systems.

The embodiments of FIGS. 5A and 5B provide separation of control into a hardware protected environment, which operates based on controls external to the O/S 217.

The above described processes relating to access control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
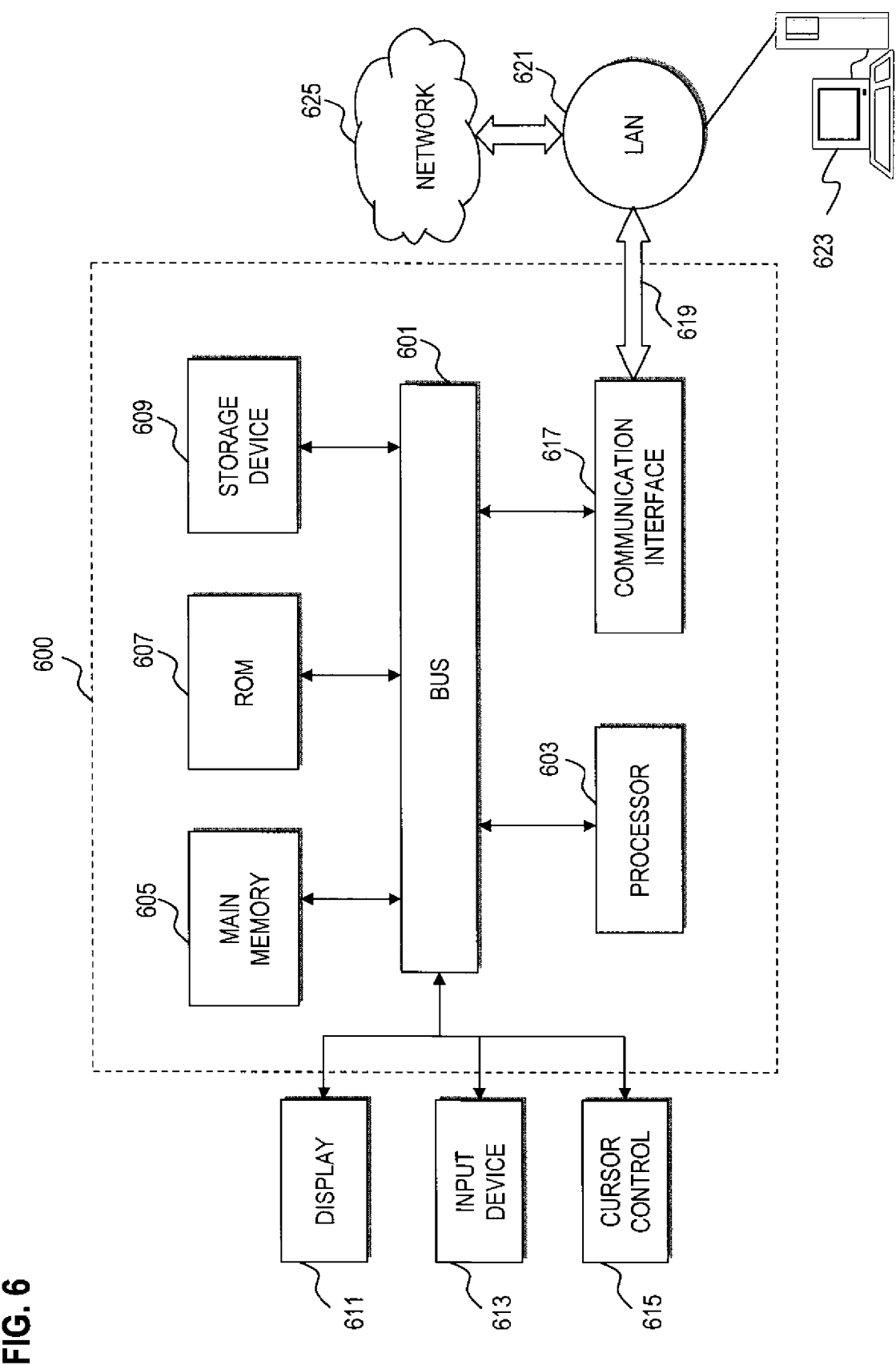
FIG. 6 is a diagram of a computer system that can be used to implement various embodiments of the present invention.

FIG. 6 illustrates a computer system 600 upon which an embodiment according to the present invention can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   detecting a request from an operating system for accessing a local storage medium, the operating system being aware of all storage areas within the local storage medium and being independent of the local storage medium; and
   selectively granting access, by an intermediary agent, to the local storage medium according to an access policy, wherein the intermediary agent is distinct from the operating system and is not in direct communication with the operating system.

2. A method according to claim 1, wherein the intermediary agent is not in communication with the operating system.

3. A method according to claim 1, further comprising:
   scanning, by the intermediary agent, the local storage medium for malware.

4. A method according to claim 1, further comprising:
   tracking, by the intermediary agent, changes of data stored within the local storage medium for data recovery.

5. A method according to claim 1, wherein the access policy specifies access for downloading of content stored within the local storage medium.

6. A method according to claim 1, wherein the intermediary agent is a trusted agent that is a part of distributed, trusted infrastructure.

7. A method according to claim 1, further comprising:
   receiving a command from a control infrastructure, wherein the control infrastructure is a central service; and
   controlling the intermediary agent in response to the command.

8. An apparatus comprising:
   an intermediary agent configured to detect a request from an operating system for accessing a local storage medium, the operating system being aware of all storage areas within the local storage medium and being independent from the local storage medium, wherein the intermediary agent is further configured to selectively grant access to the local storage medium according to an access policy, the intermediary agent being distinct from the operating system and not being in direct communication with the operating system.

9. An apparatus according to claim 8, wherein the operating system is prevented from communicating with the intermediary agent by a gatekeeper.

10. An apparatus according to claim 8, wherein the intermediary agent includes a scanning module configured to scan the local storage medium for malware.

11. An apparatus according to claim 8, wherein the intermediary agent includes a data recovery module configured to track changes of data stored within the local storage medium for data recovery.

12. An apparatus according to claim 8, wherein the intermediary agent includes a content delivery module configured to control downloading of content stored within the local storage medium.

13. An apparatus according to claim 8, wherein the intermediary agent is a trusted agent that is a part of distributed, trusted infrastructure.

14. An apparatus according to claim 8, wherein the intermediary agent is further configured to receive a command from a control infrastructure, wherein the control infrastructure is a central service and the intermediary agent is controlled in response to the command.

15. A system comprising:
a local storage medium; and
an intermediary agent configured to detect a request from an operating system for accessing the local storage medium, the operating system being aware of all storage areas within the local storage medium and being independent from the local storage medium, wherein the intermediary agent is further configured to selectively grant access to the local storage medium according to an access policy, the intermediary agent being distinct from the operating system and not being in direct communication with the operating system.

16. A system according to claim 15, further comprising a gatekeeper in communication between the intermediary agent and the operating system, wherein the gatekeeper prevents communications from occurring between the intermediary agent and the operating system.

17. A system according to claim 15, wherein the intermediary agent includes a scanning module configured to scan the local storage medium for malware.

18. A system according to claim 15, wherein the intermediary agent includes a data recovery module configured to track changes of data stored within the local storage medium for data recovery.

19. A system according to claim 15, wherein the intermediary agent includes a content delivery module configured to control downloading of content stored within the local storage medium.

20. A system according to claim 15, wherein the intermediary agent is a trusted agent that is a part of distributed, trusted infrastructure.

21. A system according to claim 15, further comprising:
a policy server configured to provide the intermediary agent the access policy.

22. A system according to claim 15, wherein the intermediary agent is either a hardware controller or a virtual machine.

* * * * *